F. OLDAKOWSKI.
SLED.
APPLICATION FILED MAR. 20, 1920.

1,354,995.

Patented Oct. 5, 1920.

INVENTOR.
Felix Oldakowski
BY Harry Jacobson
ATTORNEY.

UNITED STATES PATENT OFFICE.

FELIX OLDAKOWSKI, OF BEACON FALLS, CONNECTICUT.

SLED.

1,354,995.   Specification of Letters Patent.   Patented Oct. 5, 1920.

Application filed March 20, 1920. Serial No. 367,319.

*To all whom it may concern:*

Be it known that I, FELIX OLDAKOWSKI, citizen of Poland, residing at Beacon Falls, in the county of New Haven and State of Connecticut, have invented certain new and useful Improvements in Sleds, of which the following is a specification.

This invention relates to sleds, having more particular reference to a sled arranged and adapted to be propelled by one foot of the user while standing with the other foot on the sled.

The invention has for an object to provide a simple, light, and inexpensive sled of this type.

A further object is to provide a sled of this type with adjustable elements whereby it may be adapted for transportation either of merchandise or passengers.

For further comprehension of the invention, and of the objects and advantages thereof, reference will be had to the following description and accompanying drawings, and to the appended claims in which the various novel features of the invention are more particularly set forth.

Figure 1 of the drawings is a side elevation of a sled constructed according to the invention.

Figure 1:
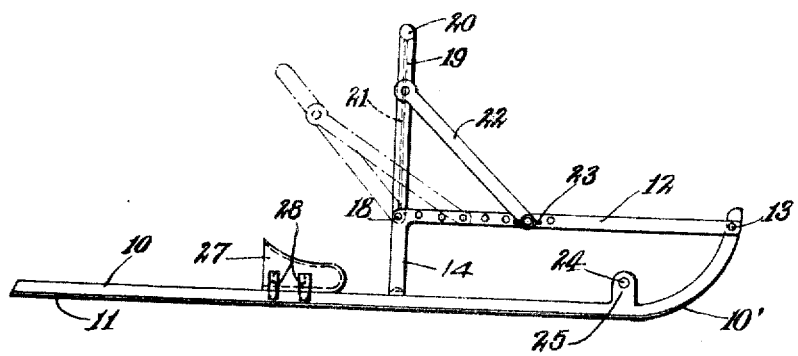
Figure 3:
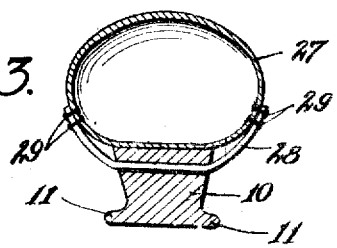
Fig. 3 is an enlarged detail transverse section on the line 3—3 of Fig. 2.

As here shown my improved sled comprises a pair of metal runners 10 which are preferably of the cross sectional shape shown in Fig. 3 with the sides inclining downwardly toward one another and the bottom formed with the laterally extending flanges 11 to widen the bearing or tread surface. The front ends of these runners are curved upwardly as shown at 10' in Fig. 1.

Supported by the forward portions of these runners are a pair of horizontal side rails 12 which may be in the form of metal straps which are riveted at their forward ends as at 13 to the upturned front ends 10' of the runners and extend rearwardly to a point approximately midway between opposite ends of the runners and are then turned downwardly as at 14 to form supporting legs or struts which are riveted or otherwise fixed at their lower ends to the bodies of the runners. These straps constitute a supporting frame for a combination platform or seat, the term platform as used hereafter being intended to designate also an element suitable for use as a seat.

This combination platform and seat is preferably formed as shown in the drawings by a series of rods 16 extending between and fixed in the horizontal side rails 12, the ends of these rods projecting beyond the side rails and being screw threaded as shown at 17.

Pivoted as at 18 to the rear ends of the side rails 12 are the lower ends of a pair of arms 19 whose upper ends are united by a rigid crossbar 20 which forms a handle. A suitable element 21 to form a back rest being carried by and between the arms 19. These arms are adapted to be adjusted to different angular position both to change the position of the handle 20, and to incline the back rest 21 as desired.

To this end a pair of links 22 are hinged at one end to the arms 19 a short distance below the crossbar 20 and extend forwardly and downwardly and have suitable eyes formed on their lower ends adapted to take over the projecting ends of the platform rods 16, wing nuts 23 being threaded on the ends of the rods to clamp the links 22 thereto. It will be apparent that by engaging these links with different rods the back rest 21 and handle 20 may be adjusted. To provide a foot-rest a bar 24 extends across between upwardly projecting lugs 25 on the runners near the front ends thereof.

The sled is adapted to be propelled by a person standing on either one of the runners 10 behind the platform, these runners having fixed thereto a pair of stirrup elements 27 adapted to inclose the forward portion of the foot. These stirrup elements are preferably secured on the runners by means of straps 28, of which there are a pair to each stirrup element, these straps passing through suitable transverse slots in the runners and being riveted at opposite ends as at 29 to the stirrup elements.

Figure 2:
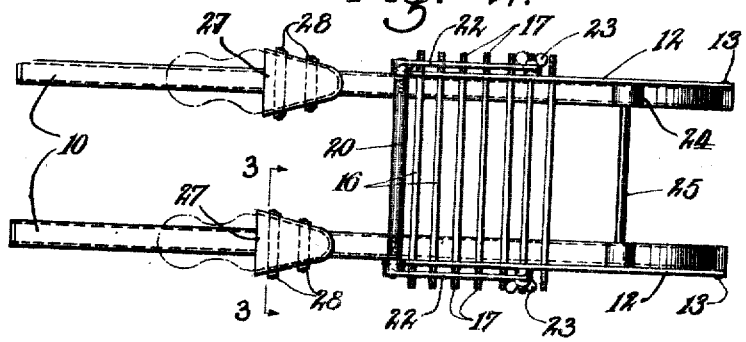
Fig. 2 is a plan view thereof.

The person propelling the sled places one foot in one of the stirrup elements 27 and pushes backwardly on the snow covered surface with the other foot, while holding the handle 20. As will be apparent the platform formed by the rods 16 may be used either to carry merchandise, or as a seat for a passenger. When traveling down an incline both feet may be placed in the stirrups, as indicated in dot and dash lines in Fig. 2.

While I have illustrated, and herein described, a preferred embodiment of my invention it is to be understood of course that various changes and modifications may be made therein without departing from the spirit of the invention, and the right is reserved to all changes and modifications coming within the spirit and scope of the invention as defined in the appended claims.

Having thus described my invention, what I claim as new and desire to protect by Letters Patent of the United States, is as follows:

1. A sled comprising a pair of runners, side rails supported above the forward portions of said runners, a series of rods rigidly connecting said side rails and forming a platform, the ends of said rods being extended beyond the side rails and screw threaded, a back rest and handle device pivoted to the rear ends of said side rails, links connected at one end to said handle device and having eyes on their opposite ends adapted to take over different ones of the said projecting ends of the rods, and nuts adapted to be threaded on the said ends and clamp the links to the side rails.

2. A sled comprising a pair of runners, side rails supported above the forward portions of said runners, a series of rods rigidly connecting said side rails and forming a platform, a pair of arms pivoted to the rear ends of said side rails, a cross bar connecting the opposite ends of said arms and forming a handle, and links hinged to said side rails and adapted to be connected to any of said rods to hold said handle in different adjusted positions.

In testimony whereof I have affixed my signature this 13th day of March, 1920.

FELIX OLDAKOWSKI.